(12) United States Patent
Fujimoto

(10) Patent No.: US 7,439,653 B2
(45) Date of Patent: Oct. 21, 2008

(54) VIBRATION WAVE DRIVING APPARATUS

(75) Inventor: Kosuke Fujimoto, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 405 days.

(21) Appl. No.: 11/377,284

(22) Filed: Mar. 17, 2006

(65) Prior Publication Data

US 2006/0220496 A1     Oct. 5, 2006

(30) Foreign Application Priority Data

Mar. 31, 2005  (JP)  ............................. 2005-103823
Feb. 22, 2006  (JP)  ............................. 2006-045504

(51) Int. Cl.
*H02N 2/00*  (2006.01)
(52) U.S. Cl. ................................. 310/323.09
(58) Field of Classification Search ............ 310/323.07, 310/323.06, 323.03, 323.04, 316.02, 317, 310/328
See application file for complete search history.

(56) References Cited

U.S. PATENT DOCUMENTS 5,099,167 A * 3/1992 Kimura et al. ......... 310/323.07
5,646,469 A * 7/1997 Tsukimoto et al. ..... 310/323.01
7,245,058 B2 * 7/2007 Fujimoto et al. ....... 310/323.08

FOREIGN PATENT DOCUMENTS

| JP | 8-103088 | 4/1996 |
|---|---|---|
| JP | 2001-145376 | 5/2001 |
| JP | 2002-315364 | 10/2002 |

* cited by examiner

*Primary Examiner*—Darren Schuberg
*Assistant Examiner*—Karen B Addison
(74) *Attorney, Agent, or Firm*—Fitzpatrick, Cella, Harper & Scinto

(57) ABSTRACT

This invention provides a vibration wave driving apparatus which makes it possible to reduce the localized abrasion of a contact member, and reduce the deterioration of performance due to long-term driving. This vibration wave driving apparatus has a contact member which is provided with fixed portions fixed to the lengthwise opposite end portions of the vibration expanding portion of the vibration member, and a connecting portion integrally connecting the two fixed portions together and having opposite ends fixed beam structure divided into a plurality.

15 Claims, 15 Drawing Sheets

VIBRATION WAVE DRIVING APPARATUS

BACKGROUND OF THE INVENTION

1. Field of the Invention

This invention relates to a vibration wave driving apparatus applied to a so-called vibration wave motor which generates vibration on an elastic member by an electromechanical energy converting element for converting an electrical amount (voltage) into a mechanical amount (vibration), and moves a contact member contacting with the elastic member.

2. Related Background Art

There has heretofore been a vibration wave motor for driving a moving element by vibration generated by a vibration element. The vibration wave motor produces a force continuously driving the moving element, by the use of mechanical vibration generated by the vibration element. Therefore, a contact member disposed between the vibration element and the moving element repeats contact with and separation from the vibration element while being deformed following the vibration of the vibration element, thereby producing a driving force. A vibration wave motor of this kind is shown in FIG. 14 of the accompanying drawings.

FIG. 14 is a cross-sectional view showing the construction of a vibration wave motor according to Japanese Patent Application Laid-open No. 2001-145376.

In FIG. 14, the vibration wave motor is a known bar-shaped vibration wave motor of a construction in which a moving member 105 is brought into pressure contact with a vibration element. The vibration element has a construction in which a shaft 104 is inserted into the inner diameter portions of a piezoelectric element 103 and metal members 101, 102, and the piezoelectric element 103 is sandwiched between the metal members 101 and 102 and is bolt-fastened by the shaft 104. A plurality of contact portions 105a having such predetermined spring rigidity that some area thereof contacts relative to the vibration of the vibration element are fixed to the moving member 105. The reference characters 101d and 101e designate the inner side portion and outer side portion, respectively, of the metal member 101, the reference character 101a denotes a connecting portion between the inner side portion and the outer side portion, the reference character 101f designates an aperture portion for a wiring substrate, the reference character 101b denotes a contact surface, the reference numeral 111 designates a wiring substrate, and the reference numeral 119 denotes a hoop for fixing the contact portions.

Each contact portion 105a is of a shape extending inwardly obliquely from the base of the cylindrically shaped moving member 105, and the extending portions can be independently deformed without contacting with one another. When surface pressure applied to the frictionally sliding portion of each contact portion with the metal member 101 becomes high, abrasion is aggravated. If the frictionally sliding portion is simply widened to mitigate this, portions which do not coincide with vibration displacement increase therein, thus resulting in the cause of abrasion, squeak or the like. In the prior art, each contact portion 105a is independently displaced and therefore, it becomes possible to make each contact portion 105a coincident with vibration displacement, and it is possible to easily construct a vibration wave motor of great torque. The displacement direction of the contact portions 105a is indicated by arrow in FIG. 14.

FIG. 16A of the accompanying drawings shows a case where the vibration displacement of the vibration member of the vibration wave motor has a smooth distribution in the circumferential direction thereof, and FIG. 16B of the accompanying drawings shows a case where the vibration displacement of the vibration member of the vibration wave motor is forced displacement concentrating in a portion.

In FIGS. 16A and 16B, in the contact portion of the vibration wave motor, there is obtained a contact reaction force (pressure reaction force) substantially proportional to vibration displacement in a case where as shown in FIG. 16A, the vibration displacement of the vibration member has a smooth distribution in the circumferential direction thereof. However, in a case where as shown in FIG. 16B, the vibration displacement of the vibration member is forced displacement concentrating in a portion, the surroundings of the forced displacement portion are also deformed because the contact portion is a circumferentially continuous beam. As the result, a reaction force corresponding to the area of which the deformation has been caused works, and the contact reaction force (pressure reaction force) due to the forced displacement increases. The concentration of such a contact reaction force may become the cause of the localized abrasion or abnormal vibration of a material producing friction in the vibration member and the contact portion, and may spoil the performance of the vibration wave motor.

FIGS. 15A and 15B of the accompanying drawings show the contact portion of a vibration wave motor according to another example of the prior art.

FIG. 15A shows the contact portion of a vibration wave motor according to Japanese Patent Application Laid-open No. 2002-315364. FIG. 15B is an enlarged view of a portion of the contact portion 205 of FIG. 15A.

In FIGS. 15A and 15B, the distal end portion of the contact portion 205 is divided into a plurality of slits. By dividing the distal end portion into a plurality of slits, it becomes possible to suppress the deformation in the contact area of the contact portion 205 with a vibration element from reaching other regions, and reduce an increase in the abrasion due to the above-mentioned concentration of the contact reaction force or the distortion of a frictional surface.

However, the contact portion of the vibration wave motor according to an example of the prior art shown in FIG. 14 is constituted by a plurality of contact portions 105a, but the cross section of each contact portion 105a is a cantilever cross section having a predetermined contact width. Each contact portion 105a contacts with the vibration element, as shown in FIG. 17 of the accompanying drawings.

The angle formed by and between the contact surface of the vibration element and the contact portion 105a when the contact portion is displaced becomes greater as the displacement becomes greater, and only the edge portions of the contact portions 105a come into contact with the vibration element with strong pressure. Therefore, it becomes necessary to reduce the pressure force of the whole against the vibration element so that stable abrasion may also occur in the edge portions of the contact portions 105a contacting with the vibration element with strong pressure. Output torque may be considered to be substantially proportional to the pressure force and thus, the output torque of the vibration wave motor is limited.

On the other hand, the contact portion 205 of the vibration wave motor according to another example of the prior art shown in FIGS. 15A and 15B can reduce the concentration of a reaction force by being divided into a plurality of slits. However, this vibration wave motor is similar to the vibration wave motor according to an example of the prior art shown in FIG. 14 in that the contact portion 205 is of cantilever structure, and there is the undesirable possibility that localized abrasion may be caused by such a contact state between the vibration element and the contact portion as shown in FIG. 17 to thereby deteriorate the performance of the vibration wave motor.

Further, in the contact portion, it is necessary to follow up to a sufficiently high frequency relative to the driving frequency of the vibration element to thereby keep stable contact, but when the contact portion is divided as shown in FIGS. 15A and 15B, the rigidity of each contact portion is reduced and the follow-up property becomes bad. Therefore, to keep the follow-up properties of the contact portions equal to each other, it becomes necessary to make the contact portions into a more minute shape, but this requires much time and labor for manufacture, and results in a higher cost.

As described above, in the construction of the conventional vibration wave motor, there is the problem that durability is reduced by the localized abrasion between the vibration element and the contact portion. Consequently, it is considered that room for improvements is left about reducing the localized abrasion of the contact member to thereby reduce the deterioration of performance due to long-term driving.

SUMMARY OF THE INVENTION

The present invention provides a construction which reduces a change in the inclination of the contact surface of a contact member when the contact member contacts with a moving element or a vibration element, thereby reducing the localized abrasion of the contact member.

At least one exemplary embodiment is directed to a vibration wave driving apparatus having:

a vibration element provided with an electro-mechanical energy converting element;

a moving element driven by vibration generated by the vibration element; and a plurality of contact members interposed between the vibration element and the moving element;

wherein each of the contact members is provided with:

a plurality of fixed portions fixed to one of the vibration element and the moving element;

a plurality of connecting portions connected among the plurality of fixed portions, individually elastically deformable in a state separate from one of the vibration element and the moving element to which the fixed portions are fixed, and disposed at an interval narrower than the interval between adjacent ones of the contact members; and a contact surface constituting a portion of each of said connecting portions, and contacting with the moving element or the vibration element opposed to the contact members.

The above and other objects, features, and advantages of the invention will become more apparent from the following detailed description taken in conjunction with the accompany drawings.

DESCRIPTION OF THE PREFERRED EMBODIMENTS

Some embodiments of the present invention will hereinafter be described with reference to the drawings.

First Embodiment

Figure 1:
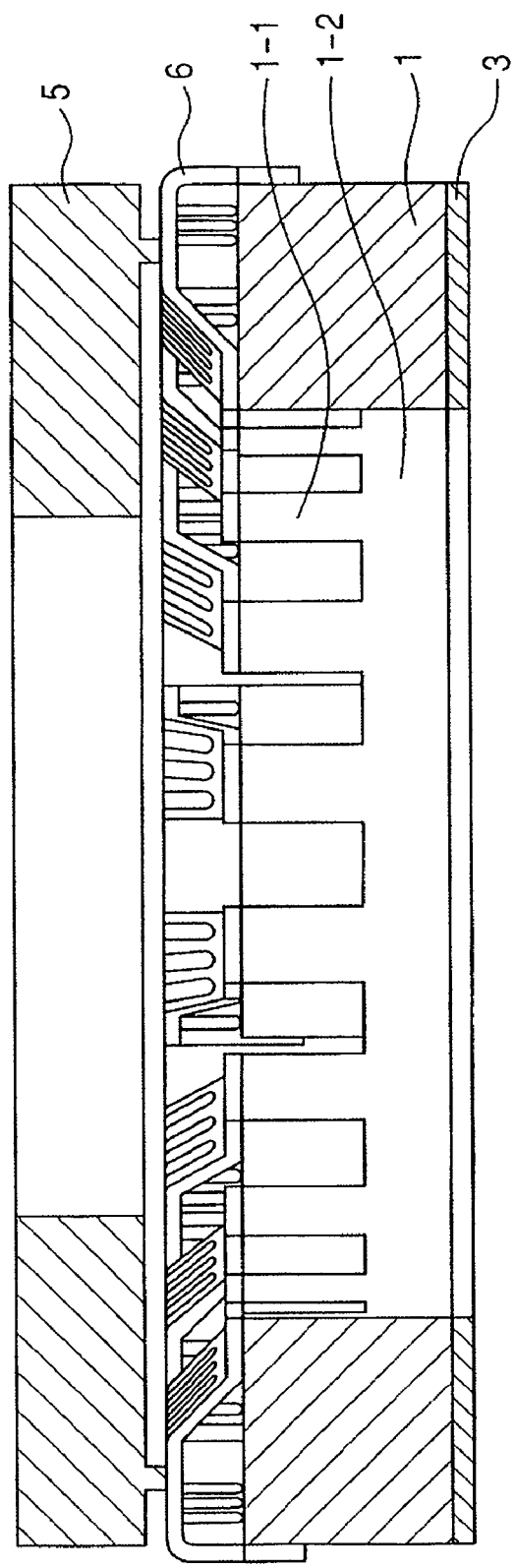
FIG. 1 is a cross-sectional view showing the construction of a vibration wave motor as a vibration wave driving apparatus according to a first embodiment of the present invention.

FIG. 1 is a cross-sectional view showing the construction of a vibration wave motor as a vibration wave driving apparatus according to a first embodiment of the present invention.

In FIG. 1, the vibration wave motor is formed into a circular ring shape, and is provided with a vibration member 1, a piezoelectric element 3, a moving element 5 and a plurality of contact members 6.

The vibration member 1 is a metallic elastic member having radial projections, and is comprised of vibration expanding portions 1-1 and a vibration member base 1-2. The radial projections are the vibration expanding portions 1-1. The piezoelectric element 3 is an electromechanical energy converting element which converts an electrical amount (voltage) into a mechanical amount (vibration), and is joined to the vibration member 1. A vibration element is constituted by the vibration member 1 and the piezoelectric element 3. Each contact member 6 is made by the press working of a sheet, and a plurality of such contact members 6 are disposed along the circumferential direction of the vibration member 1, and are joined to the upper surfaces of the vibration expanding portions 1-1 by welding or adhesive securing. Each of these contact members 6 is a contact portion with the moving element 5.

The moving element 5 is designed to pressure-contact with the vibration member 1 with the contact surfaces of the contact members 6 interposed therebetween by a pressure force of pressing means, not shown. Also, the moving element 5 is driven by the frictional force between the displacement due to the vibration of the vibration member 1 and the contact surfaces of the contact members 6. In the vibration wave motor, the driving force of the moving element 5 is transmitted to an apparatus outside the vibration wave motor through an output shaft provided, for example, at the central position of the rotation of the moving element 5 to thereby drive this apparatus.

Figure 2:
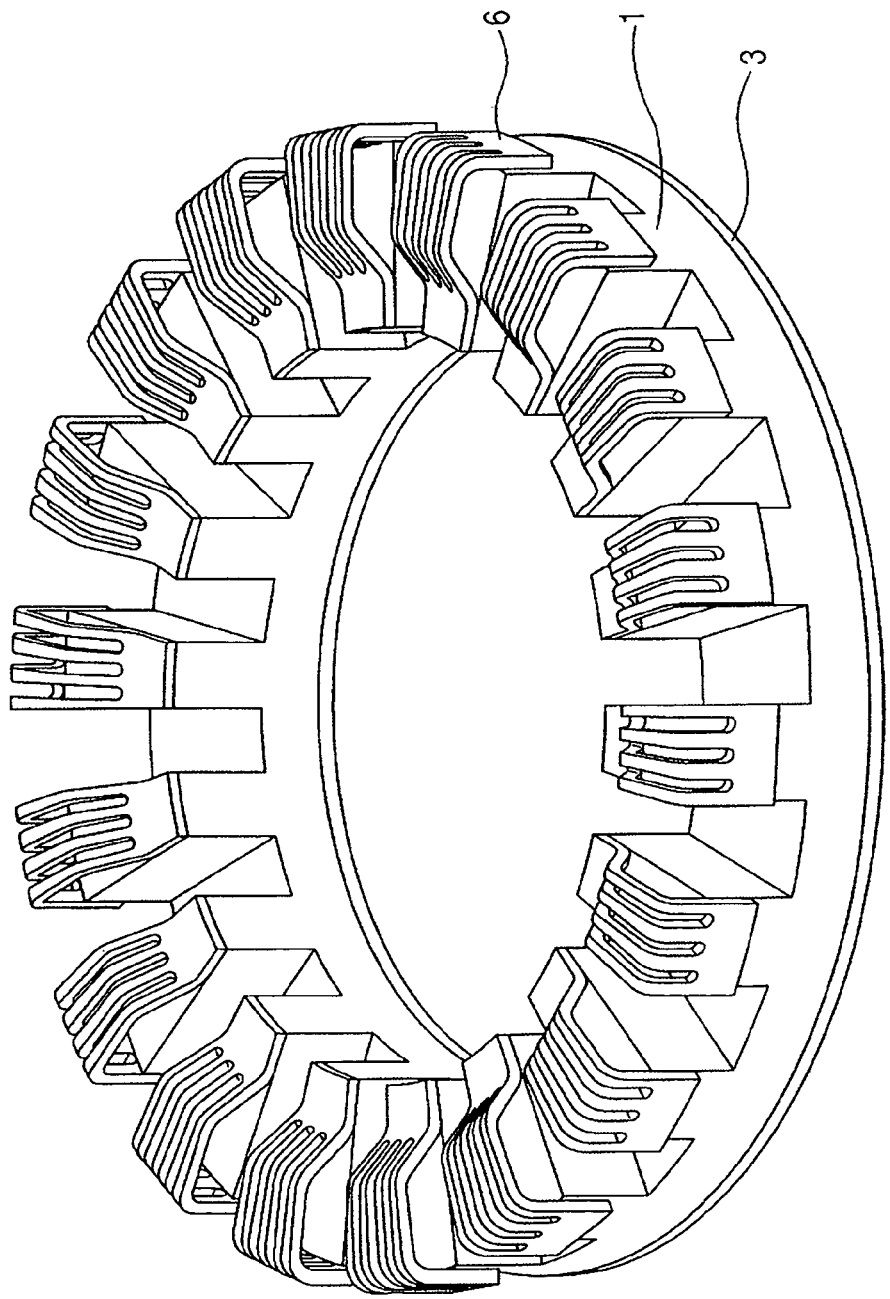
FIG. 2 is a pictorial perspective view showing the vibration member and contact portion of the vibration wave motor shown in FIG. 1.
Figure 3:
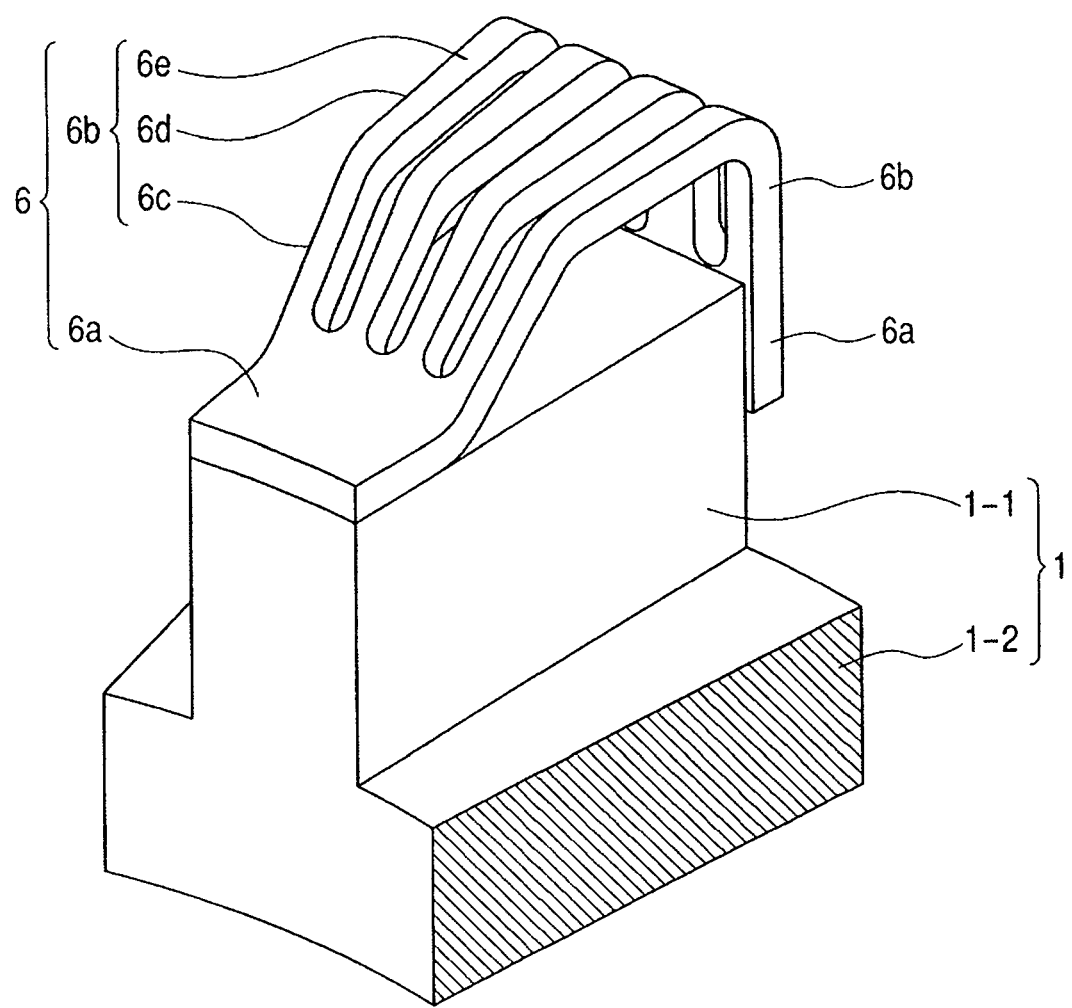
FIG. 3 is a partly enlarged perspective view of the vibration member and contact portion of the vibration wave motor shown in FIG. 2.

FIG. 2 is a pictorial perspective view of the vibration member 1 and contact members 6 of the vibration wave motor shown in FIG. 1. FIG. 3 is a partly enlarged perspective view of the vibration member 1 and contact member 6 of the vibration wave motor shown in FIG. 2.

In FIGS. 2 and 3, each contact member 6 is comprised of a pair of fixed portions 6a fixed to the diametrally opposite end portions (see FIG. 3) of the vibration expanding portion 1-1 of the vibration member 1, and a connecting portion 6b having the structure of an opposite ends fixed beam connecting the opposite fixed portions integrally with each other. Further, the connecting portion 6b is comprised of a leg portion 6c, a beam portion 6d, a contact surface 6e and a vertical leg portion. Each of the leg portion 6c, the beam portion 6d, the contact surface 6e and the vertical leg portion is divided into four.

The leg portion 6c is connected to the fixed portion 6a on the inner peripheral side, and is extended out at an angle of 90° or less with respect to a normal to the contact surface 6e in order to bring the beam portion 6d into non-contact with the vibration expanding portion 1-1. Each beam portion 6d is disposed in parallelism to the upper surface of the vibration expanding portion 1-1. The contact surface 6e corresponds to the upper surface of the central portion of each beam portion 6d. The vertical leg portion is extended out in a direction perpendicular to the contact surface 6e in order to bring the beam portion 6d also into non-contact with the vibration expanding portion 1-1.

Of the fixed portions 6a fixed to the diametrally opposite end portions of the vibration expanding portion 1-1, the fixed portion 6a on the inner peripheral side is fixed to the upper surface of the vibration expanding portion 1-1, and the fixed portion 6a on the outer peripheral side is fixed to the outer peripheral surface of the vibration expanding portion 1-1. A plurality of connecting portions 6b are disposed at regular intervals along the propagation direction of a vibration wave (the circumferential direction of a vibration element) generated by a vibration element comprising the vibration member 1 and the piezoelectric element 3. In order to facilitate vibration displacement in different directions, the interval between adjacent ones of the contact portions, i.e., the interval between adjacent ones of the vibration expanding portions 1-1, is set sufficiently more widely than the interval between adjacent ones of a plurality of beam portions 6d in a contact portion. The fixed portions 6a and the connecting portion 6b constituting the contact member 6 have the function as a contact spring for the moving element 5.

Figure 4:
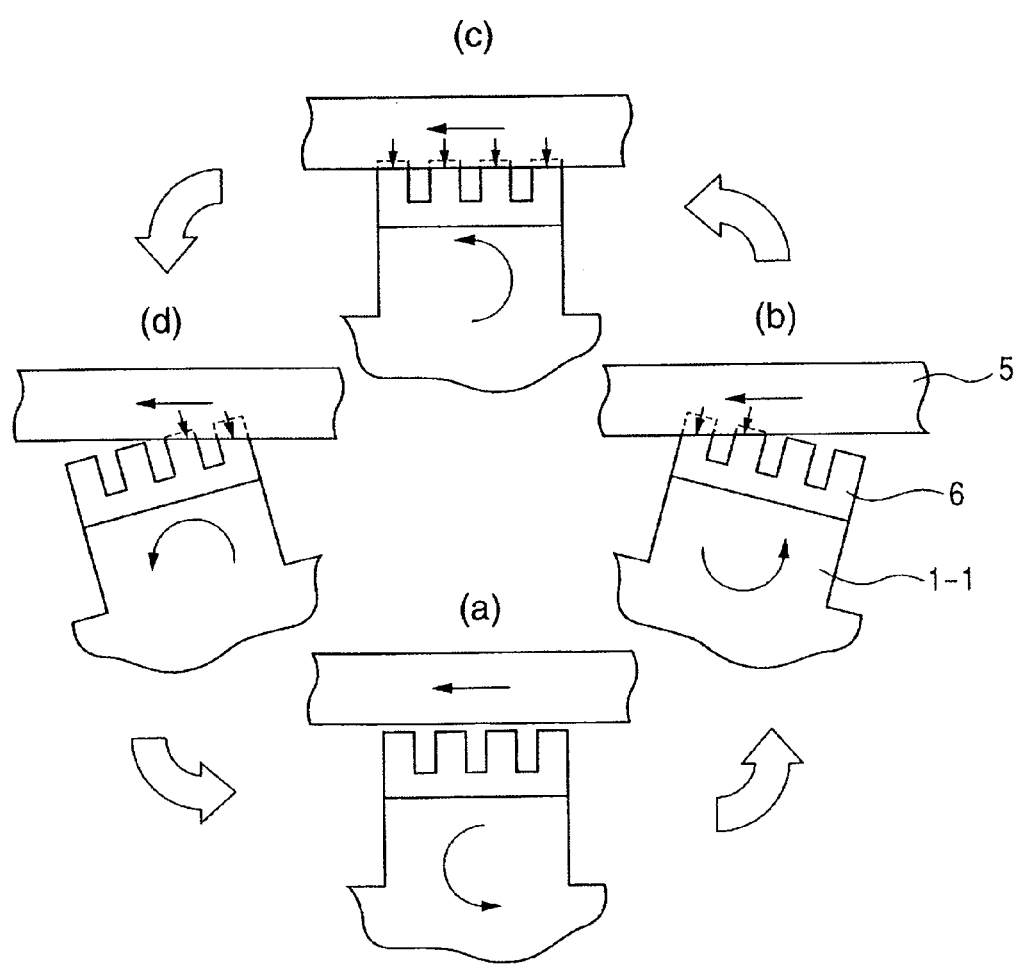
FIG. 4 shows the manner in which the contact portion shown in FIG. 3 contacts with a moving element in the order of the lapse of time.

FIG. 4 shows the manner in which the contact member 6 of the vibration wave motor contacts with the moving element 5 in the order of the lapse of time.

In FIG. 4, a driving voltage is applied to the piezoelectric element 3 (not shown in FIG. 4) joined to the vibration member 1, and a travelling vibration wave is generated in a vibration element comprising the vibration member 1 and the piezoelectric element 3 by a known technique. Along with this, as indicated by arrows in FIG. 4, feeding motion on an elliptical orbit occurs on the upper surface of the vibration expanding portion 1-1 of the vibration member 1, and drives the moving element 5 through the contact member 6.

(a) in FIG. 4 shows a state in which the moving element 5 and the contact member 6 are spaced apart from each other, and at (b) in FIG. 4, the contact member 6 starts its contact with the moving element 5 from its left end. When at (c) in FIG. 4, the moving element 5 has arrived at the uppermost portion of the contact member 6, the whole surfaces of the moving element 5 and the contact member 6 come into contact with each other. (d) in FIG. 4 shows a state in which the right end of the contact member 6 has come into contact with the moving element 5, and return is made to the state of (a) in FIG. 4 after the contact between the contact member 6 and the moving element 5 has ended.

The connecting portion 6b of the contact member 6 is provided with four contact surfaces 6e as shown in FIG. 3, and each contact surface 6e is independently displaceable by the deformation of the connecting portion 6b. In the state in which as shown in (b) in FIG. 4 or (d) in FIG. 4, the left end or the right end of the contact member 6 has contacted with the moving element 5, in the conventional structure, only the vicinity of the edge portion of the contact member has contacted to thereby cause an increase in contact pressure.

In contrast, in the present embodiment, by adopting structure in which the plurality of contact springs (the leg portion 6c, the beam portion 6d and the contact surface 6e constituting the connecting portion 6b) of the contact member are disposed in the movement direction of the moving element 5, it becomes possible to soften the rigidity of each spring. Thereby, design is made such that when the edge portion of the connecting portion 6b of the contact member 6 contacts with the moving element 5, the contact spring near the edge portion is greatly displaced, whereby the contact surfaces around the edge portion can also be brought into contact with the moving element (see (b) and (c) in FIG. 4).

In the state in which as shown in (c) in FIG. 4, the whole of the contact member 6 contacts with the moving element 5, all the connecting portions 6b (the leg portion 6c, the beam portion 6d and the contact surface 6e divided into four) of the contact member 6 behave as contact springs of high rigidity. That is, in the present embodiment, the contact member 6 is constituted as a plurality of contact springs, whereby relative to the movement direction of the moving element 5, the displacement of a portion like the edge portion of the contact member 6 in which stress is liable to concentrate is dispersed, and the dispersion of contact pressure is possible.

Description will now be made of the behavior of the contact member 6 in a plane orthogonal to the movement direction of the moving element 5 in the vibration wave motor according to the present embodiment.

Figure 5A:
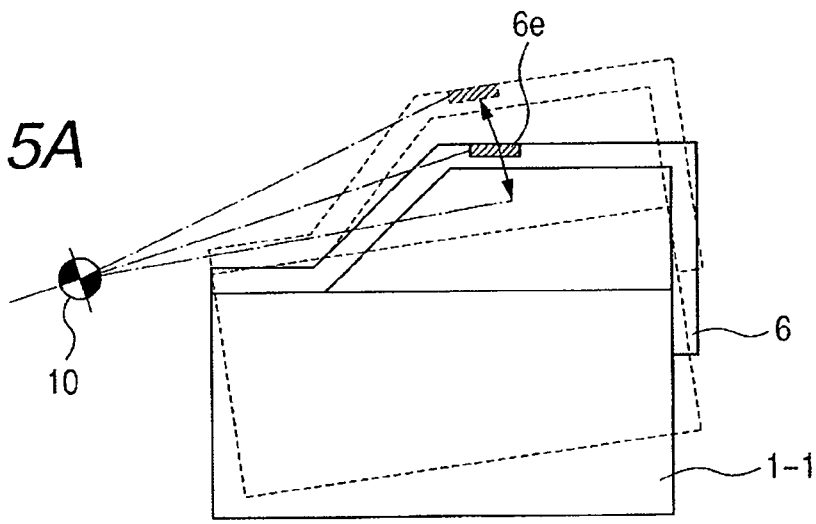
FIGS. 5A, 5B and 5C show the displacement and deformation of a contact member in a cross section orthogonal to the movement direction of the moving element shown in FIG. 4.
Figure 5B:
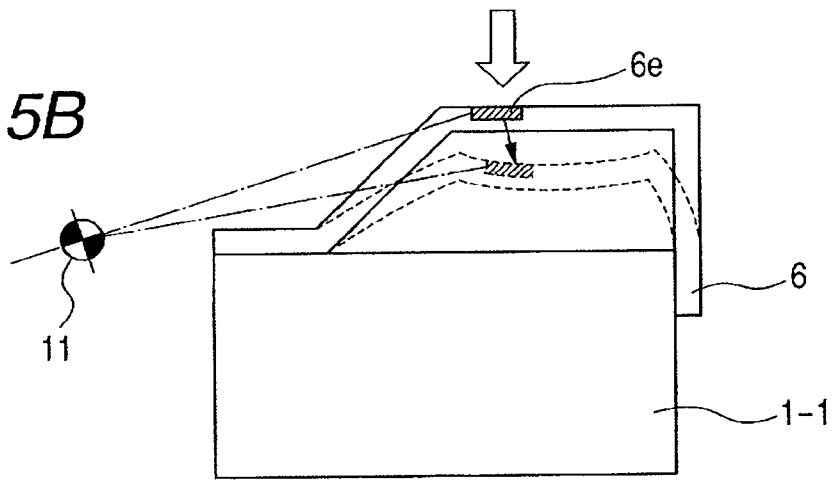
Figure 5C:
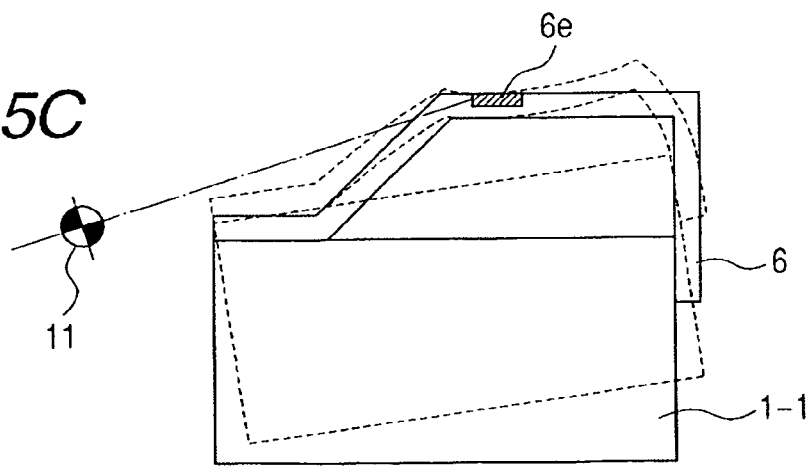

FIGS. 5A to 5C show the displacement and deformation of the contact member 6 in a cross section orthogonal to the movement direction of the moving element 5.

In FIGS. 5A to 5C, the vibration element comprising the vibration member 1 and the piezoelectric element 3, when attention is paid to a portion of the contact member 6, vibrates in a direction indicated by a solid-line arcuate arrow as in FIG. 5A. The direction indicated by this arrow is referred to as the vibration direction of the vibration element. Further, each portion of the vibration element differs in the vibration direction and the magnitude of vibration depending on the position thereof, and in the vibration at a minute amplitude, it is possible to grasp it as rotational vibration about a certain point. The center at this time is the momentary rotation center of the vibration of the vibration element.

In the present embodiment, as indicated by a circular mark in FIGS. 5A to 5C, the momentary rotation center 10 is on the inner peripheral side of the vibration element and below the contact surface 6e of the contact member 6, and the vibration element vibrates about this rotation center 10 in the direction indicated by the arcuate arrow in FIG. 5A. Vibration displacement is small in that portion of the contact surface 6e of the contact member 6 which is near the rotation center 10, and vibration displacement increases away from the rotation center 10. On the other hand, the moving element 5 contacting with the contact member 6 may be considered to be a rigid member which is hardly deformed and therefore, the displacement in the contact surface 6e of the contact member 6 relative to the moving element 5 also becomes greater away from the momentary rotation center 10.

Solid lines indicated in FIG. 5B indicate the shape of the contact member 6 in its free state, and two leg portions 6c (an oblique portion and a vertical portion) constituting the connecting portion 6b of the contact member 6 and the contact surface 6e (see FIG. 3) together constitute a trapezoidal shape. In FIG. 5B, broken lines indicate a state in which longitudinally forced displacement has been applied to the contact surface 6e to thereby deform the contact member. The direction indicated by a hollow arrow is a direction in which contact pressure is applied to the contact member 6. By the deformation of the two leg portions 6c constituting the connecting portion 6b of the contact member 6 and the bending deformation of the horizontal beam portion 6d, it becomes possible to locate the rotation center 11 of the contact surface 6e of the contact member 6 near the momentary rotation center 10 of the vibration element.

FIG. 5C represents the deformation of the contact member 6 in the vibrating state, and this deformation is represented as the sum of the deformation shown in FIG. 5A and the deformation shown in FIG. 5B. The rotation center 11 of the deformation of the contact member 6 is made coincident with the momentary rotation center 10 of the vibration element, whereby the position and inclination of the contact surface 6e of the contact member 6 is not changed during the contact thereof, and the contact surface 6e keeps a state parallel to the moving element 5. Therefore, even if during the driving of the vibration wave motor, the contact pressure between the contact member 6 and the moving element 5 changes and the deformation amount of the contact member 6 changes, the contact with the moving element 5 becomes possible over the entire contact surface. Thereby, the contact surface pressure of the contact member 6 can be made uniform, and it becomes possible to reduce such localized abrasion that abrasion progresses more in a portion wherein the vibration amplitude between the contact member 6 and the moving element 5 is greater.

In the present embodiment, in a plane formed by two directions, i.e., the movement direction of the moving element 5 and a direction orthogonal to the movement direction of the moving element 5, the concentration of the contact surface pressure between the contact member 6 and the moving element 5 can be alleviated to thereby realize a uniform contact state between the contact member 6 and the moving element 5. Thereby, it becomes possible to construct a vibration wave motor which can avoid such deterioration of performance as will cause localized abrasion and abnormal vibration, and can maintain its performance stably for a long period of time.

As described above, according to the present embodiment, the contact member 6 is provided with the fixed portion 6a and a plurality of connecting portions 6b having opposite-ends fixed beam structure and individually elastically deformable, whereby it becomes possible to reduce a change in the inclination of the contact surface 6e of the contact member 6 when the contact member 6 has contacted with the moving element 5. Further, the contact member 6 is flexibly displaced relative to the localized contact pressure from the moving element and therefore, it becomes possible to reduce the localized abrasion of the contact member 6, and reduce the deterioration of performance due to the long-term driving of the vibration wave motor.

Also, the connecting portions 6b of the contact member 6 are disposed in the propagation direction of the vibration wave (the circumferential direction of the vibration member 1), whereby it becomes possible to alleviate the concentration of the contact pressure against the contact member 6 in the distribution of the propagation direction of the vibration wave, and reduce the abrasion of the contact member 6.

Also, the connecting portions 6b of the contact member 6 are integrally constructed through the fixed portions 6a, whereby it becomes possible to enhance the accuracy of the relative positions of the connecting portions 6b and also, the inexpensive manufacture of a vibration wave motor including the contact members 6 becomes possible.

Also, each connecting portion 6b of the contact member 6 is provided with a leg portion extending out in a direction perpendicular to the contact surface, and a leg portion extending out at an angle of 90° or less with respect to a normal to the contact surface, whereby it becomes possible to design the rotation center by the forced displacement of the contact member 6 to a predetermined value. Thereby, it becomes possible to reduce the bias which means that the contact pressure is biased against the contact surface 6e of the contact member 6, and it becomes possible to enhance the durability of the contact member 6.

Second Embodiment

Figure 6:
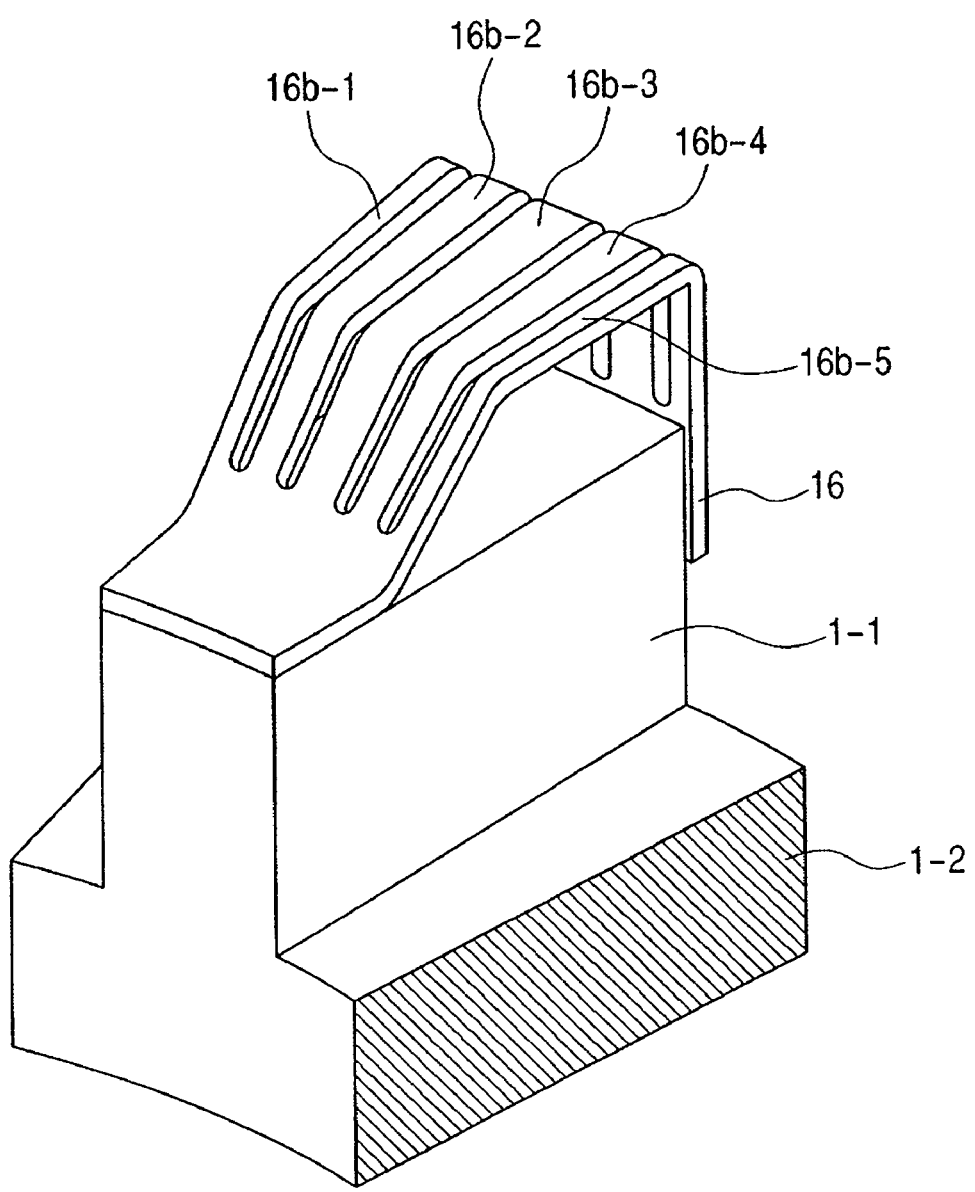
FIG. 6 is a partly enlarged perspective view of the vibration member and contact portion of a vibration wave motor according to a second embodiment of the present invention.

A second embodiment of the present invention differs from the above-described first embodiment in that the contact portion is of such structure as shown in FIG. 6. The other elements (the vibration member 1, the piezoelectric element 3 and the moving element 5) in the present embodiment are the same as the corresponding ones of the above-described first embodiment and therefore need not be described.

FIG. 6 is a partly enlarged perspective view of the vibration member and contact portion of a vibration wave motor according to the present embodiment.

In FIG. 6, a contact member 16 is provided with connecting portions 16b-1 to 16b-5 having opposite-ends fixed beam structure divided into a plurality (five in the present embodiment).

Of the connecting portions 16b-1 to 16b-5, the width of the connecting portion 16b-3 located at the center is widest, and the widths of the connecting portion 16b-1 and the connecting portion 16b-5 located at the opposite ends are narrowest. The width of the connecting portion 16b-2 and the connecting portion 16b-4 is a width between the widest width and the narrowest width. That is, the widths of the connecting portions 16b-1 to 16-5 are formed in such a manner that the widths of the connecting portions nearer to the opposite ends with respect to the movement direction of the moving element 5 are smaller.

Description will now be made of action and effects peculiar to the vibration wave motor according to the present embodiment.

Figure 7:
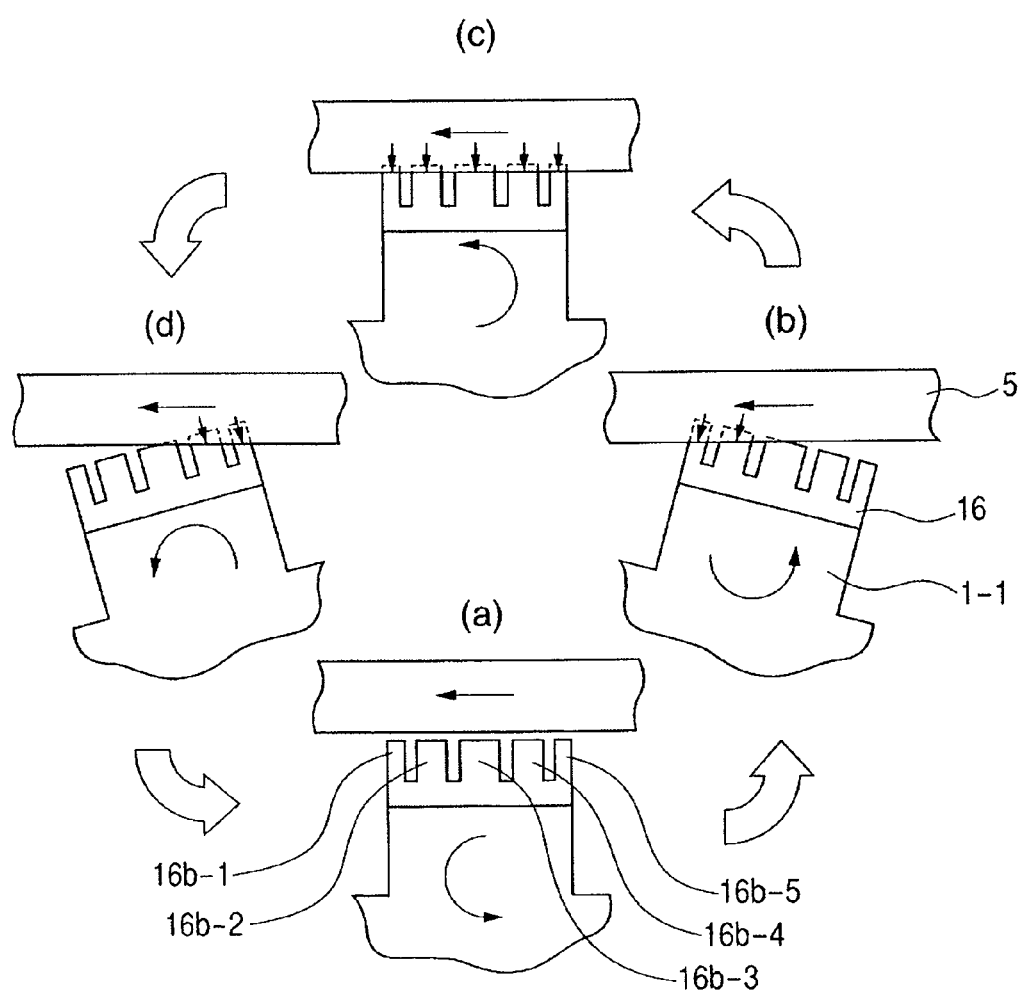
FIG. 7 shows the manner in which the contact portion shown in FIG. 6 contacts with a moving element in the order of the lapse of time.

FIG. 7 shows the manner in which the contact member 16 shown in FIG. 6 contacts with the moving element 5 in the order of the lapse of time.

(a) in FIG. 7 shows a state in which the moving element 5 and the contact member 16 are spaced apart from each other. (b) in FIG. 7 shows a state in which the contact member 16 has started its contact with the moving element 5 from its left end portion. The connecting portion 16b-1 at the left end of the contact member 16 and the connecting portion 16b-2 near the left end are greatly displaced because they are small in the width of the beam and small in rigidity. Therefore, the contact area between the moving element 5 and the contact member 16 can be widened. (c) in FIG. 7 shows a case where vibration displacement has become greatest, and all the contact surfaces of the connecting portions of the contact member 16 are in contact with the moving element 5. Therefore, uniform contact pressure is provided irrespective of the differences among the widths of the connecting portions of the contact member 16.

(d) in FIG. 7 shows a process in which the moving element 5 and the contact member 16 end their contact and become spaced apart from each other, and the right end portion of the contact member 16 is in contact with the moving element 5. As at the start of the contact shown in (b) in FIG. 7, the connecting portion 16b-5 at the right end of the contact member 16 and the connecting portion 16b-4 near the right end are greatly displaced because they are small in the width of the beam and small in rigidity. Therefore, the contact member 16 becomes spaced apart from the moving element 5 in a state in which the contact area has widened more inwardly (a state in which the connecting portion 16b-5 at the right end to the connecting portion 16b-3 at the center are in contact with the moving element 5.

As described above, according to the present embodiment, of the connecting portions 16b-1 to 16b-5 of the contact member 16, the connecting portions nearer to the opposite ends with respect to the movement direction of the moving element 5 are made smaller in width and therefore, it becomes possible to reduce the rigidity of the connecting portions near the opposite ends. Thereby, the alleviation of concentrative stress which has been impossible in the structure of the conventional contact portion can be realized. The behavior of the contact member 16 in a plane orthogonal to the movement direction of the moving element 5 is similar to that in the aforedescribed first embodiment and therefore, it becomes possible to realize a further improvement in the stability of the performance of the vibration wave motor.

Third Embodiment

Figure 8:
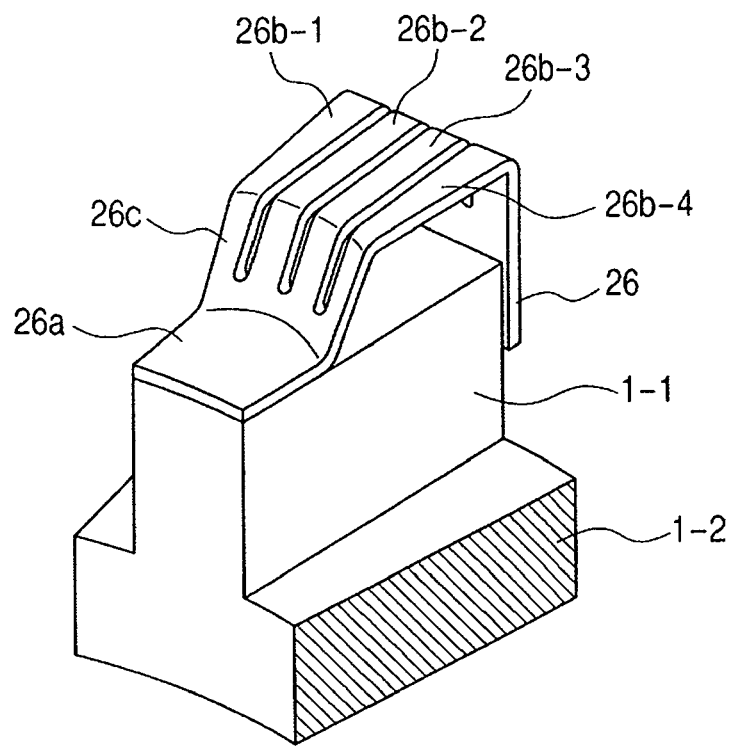
FIG. 8 is a partly enlarged perspective view of the vibration member and contact portion of a vibration wave motor according to a third embodiment of the present invention.

A third embodiment of the present invention differs from the above-described first embodiment in that the contact portion is of such structure as shown in FIG. 8. The other elements (the vibration member 1, the piezoelectric element 3 and the moving element 5) in the present embodiment are the same as the corresponding ones of the above-described first embodiment and therefore need not be described.

FIG. 8 is a partly enlarged perspective view of the vibration member and contact portion of a vibration wave motor according to the present embodiment.

In FIG. 8, a contact member 26 is provided with a fixed portion 26a, connecting portions 26b-1 to 26b-4 having opposite-ends fixed beam structure divided into a plurality (four in the present embodiment), and four leg portions 26c for connecting the fixed portion 26a and the connecting portions 26b-1 to 26b-4 together.

The bases (the side connected to the fixed portion 26a) of the leg portions 26c corresponding to the connecting portions 26b-1 and 26b-4 at the opposite ends are located more toward the inner diameter side of the vibration member 1 than the bases of the leg portions 26c corresponding to the connecting portions 26b-2 and 26b-3 on the inner side. Also, the length of the leg portions 26c corresponding to the connecting portions 26b-1 and 26b-4 at the opposite ends is made greater than the length of the leg portions 26c corresponding to the connecting portions 26b-2 and 26b-3 on the inner side.

That is, of the connecting portions 26b-1 to 26b-4 of the contact member 26, the connecting portions nearer to the opposite ends with respect to the movement direction of the moving element 5 (the connecting portions disposed in portions great in vibration amplitude) are made long in the distance from the fixed portion 26a. Thereby, the connecting portions 26b-1 and 26b-4 at the opposite ends of the contact member 26 become great in the length of the opposite-ends fixed beams, and become small in rigidity. Also, it becomes possible to alleviate the concentration of contact pressure in two directions, i.e., the arrangement direction and length direction of the connecting portions 26b-1 to 26b-4.

As described above, according to the present embodiment, of the connecting portions 26b-1 to 26b-4 of the contact member 26, the connecting portions nearer to the opposite ends with respect to the movement direction of the moving element 5 are made longer. This leads to the advantage that in changing the rigidity of the contact member 26, it is not necessary to change the widths of the contact surfaces of the connecting portions 26b-1 to 26b-4. When the contact member is to be formed by shearing work by press, the minimum working width is limited by the thickness of a plate, but in the present embodiment, the width of the connecting portions 26b-1 to 26b-4 of the contact member 26 can be formed to a predetermined width and therefore, the working property is good. Moreover, there is the advantage that the connecting portion of the contact member 26 is divided into a great number, whereby it does not happen that the total contact area between the contact member 26 and the moving element 5 is decreased.

Fourth Embodiment

Figure 9:
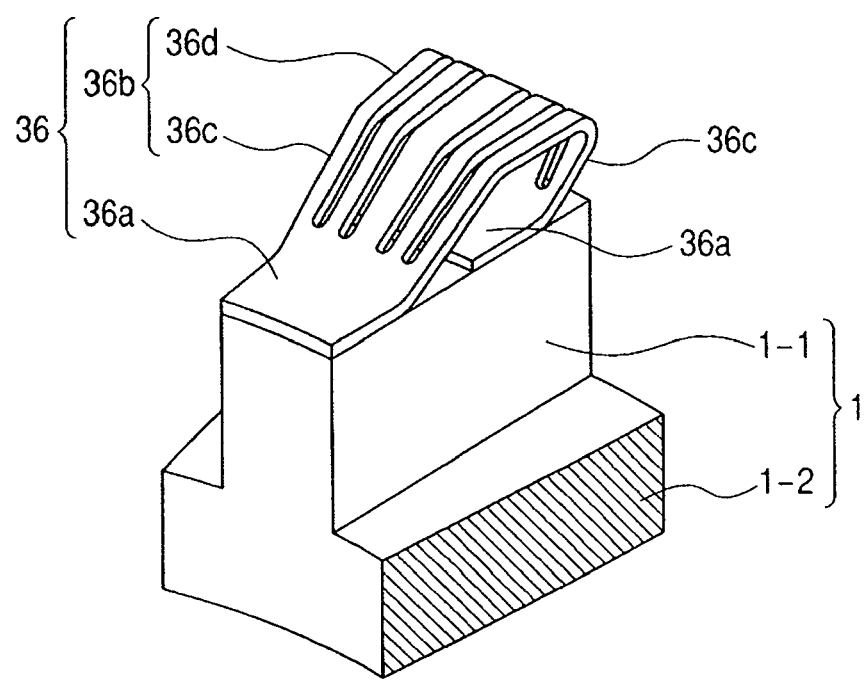
FIG. 9 is a partly enlarged perspective view of the vibration member and contact portion of a vibration wave motor according to a fourth embodiment of the present invention.

A fourth embodiment of the present invention differs from the above-described first embodiment in that the contact portion is of such structure as shown in FIG. 9. The other elements (the vibration member 1, the piezoelectric element 3 and the moving element 5) in the present embodiment are the same as the corresponding ones of the above-described embodiments and therefore need not be described.

FIG. 9 is a partly enlarged perspective view of the vibration member and contact portion of a vibration wave motor according to the present embodiment.

In FIG. 9, a contact member 36 is comprised of a fixed portion 36a and a connecting portion 36b having opposite-ends fixed beam structure divided into a plurality (five in the present embodiment). Further, the connecting portion 36b is comprised of leg portions 36c on the inner peripheral side and the outer peripheral side, and a beam portion 36d.

The leg portion 36c located on the outer peripheral side relative to the vibration member 1 is formed into a state turned back at an acute angle toward the leg portion 36c side located on the inner peripheral side relative to the vibration member 1. Further, the leg portion 36c on the outer peripheral side is formed longer than the leg portion 36c on the inner peripheral side. Also, an electrode is inserted into the gap between adjacent ones of the five connecting portions 36b, and the fixed portion 36a is fixed to the vibration member 1 by electrical resistance welding.

Figure 10:
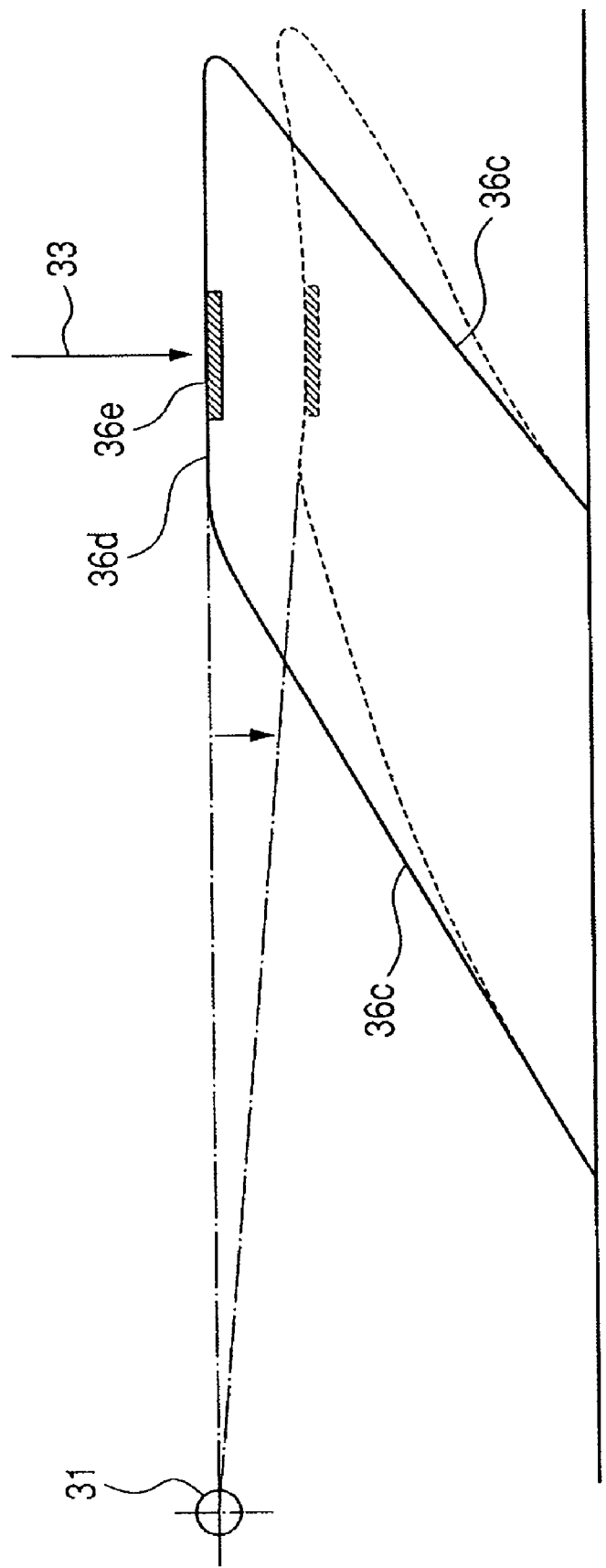
FIG. 10 shows the states before and after the deformation of the contact portion shown in FIG. 9.

FIG. 10 shows the states of the contact member 36 before and after the deformation thereof.

In FIG. 10, contact pressure (indicated by arrow 33) from the moving element 5 is applied to the contact surface 36e of the contact member 36. A portion encircled by solid line represents the state of the contact member 36 before the deformation thereof, and a portion encircled by broken line represents the state of the contact member 36 deformed by the contact pressure from the moving element 5.

As described above, according to the present embodiment, the outer peripheral side leg portion 36c of the contact member 36 is of structure in which it is turned back at an acute angle toward the inner peripheral side leg portion 36c side, and the angles and lengths of the outer peripheral side leg portion 36c and the inner peripheral side leg portion 36c relative to the upper surface of the vibration expanding portion 1-1 of the vibration member 1 are changed, whereby it becomes possible to design the momentary rotation center 31 of the contact surface 36e at an arbitrary position.

Fifth Embodiment

Figure 11:
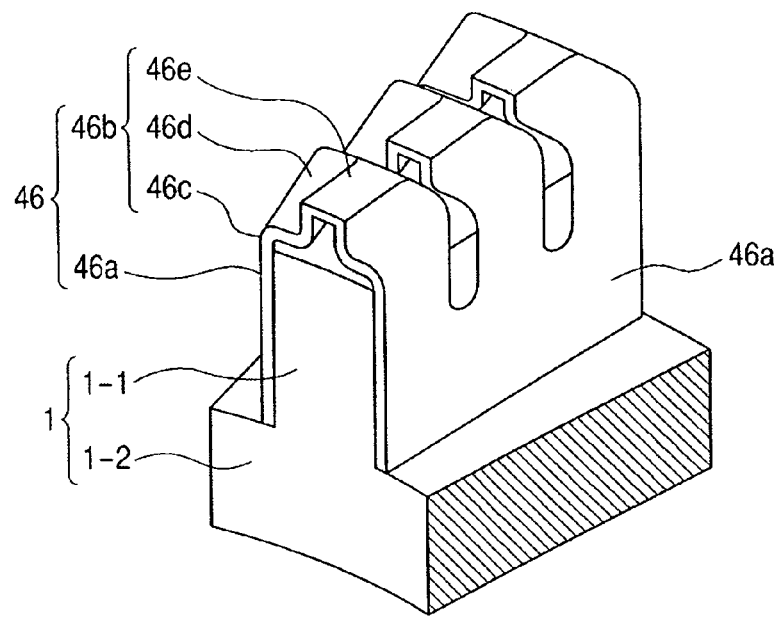
FIG. 11 is a partly enlarged perspective view of the vibration member and contact portion of a vibration wave motor according to a fifth embodiment of the present invention.

A fifth embodiment of the present invention differs from the above-described first embodiment in that the contact portion is of such structure as shown in FIG. 11. The other elements (the vibration member 1, the piezoelectric element 3 and the moving element 5) in the present embodiment are the same as the corresponding ones in the first embodiment and therefore need not be described.

FIG. 11 is a partly enlarged perspective view of the vibration member and contact portion of a vibration wave motor according to the present embodiment.

In FIG. 11, a contact member 46 is comprised of fixed portions 46a fixed to the widthwise opposite side portions of the vibration expanding portion 1-1 of the vibration member 1, and connecting portions 46b having opposite-ends fixed beam structure divided into a plurality (three in the present embodiment). Further, each connecting portion 46b is comprised of a beam portion 46d and a contact surface 46e.

In the above-described first to fourth embodiments, the plurality of connecting portions constituting the contact member are arranged in the movement direction of the moving element 5. In contrast, in the present embodiment, a plurality of connecting portions 46b each having a contact surface 46e are disposed in a direction orthogonal to the movement direction of the moving element 5 in a plane containing the contact surface of the contact member 46 with the moving element 5. In a circular ring-shaped vibration wave motor, a plurality of contact surfaces 46e are disposed in a diametral direction, and it becomes possible to change the flexural rigidity of the plurality of contact surfaces 46e in the diametral direction. Each connecting portion 46b connects the fixed portion 46a and the contact surface 46e together by a curved surface.

Also, in the present embodiment, toward the outer peripheral side of the vibration wave motor, the length of the connecting portion 46b (the width dimension along the circumferential direction of the vibration wave motor: and so forth), i.e., the length of the beam portion 46d to which bending deformation occurs, is made great to thereby set the flexural rigidity low. The momentary rotation center of the contact surface 46e of the contact member 46 exists below on the inner peripheral side of the vibration wave motor and therefore, the amplitude of the vibration member 1 becomes greater toward the outer peripheral side of the vibration wave motor, and the deformation amount when the contact member 46 contacts with the moving element 5 also becomes greater.

So, if the flexural rigidity of the contact member 46 on the outer peripheral side of the vibration wave motor is made low, a remarkable increase in the contact pressure from the moving element 5 to the contact member 46 occurring due to the great amplitude of the vibration member 1 on the outer peripheral side can be avoided. Moreover, it becomes possible to distribute the contact pressure averagely to the contact member 46 over the inner and outer diameters thereof.

Further, in the present embodiment, in the plurality of connecting portions 46b, each beam portion 46d is formed into a state inclined toward the momentary rotation center of the vibration element (toward the inner peripheral side of the vibration wave motor) except the contact surface 46e.

Figure 12:
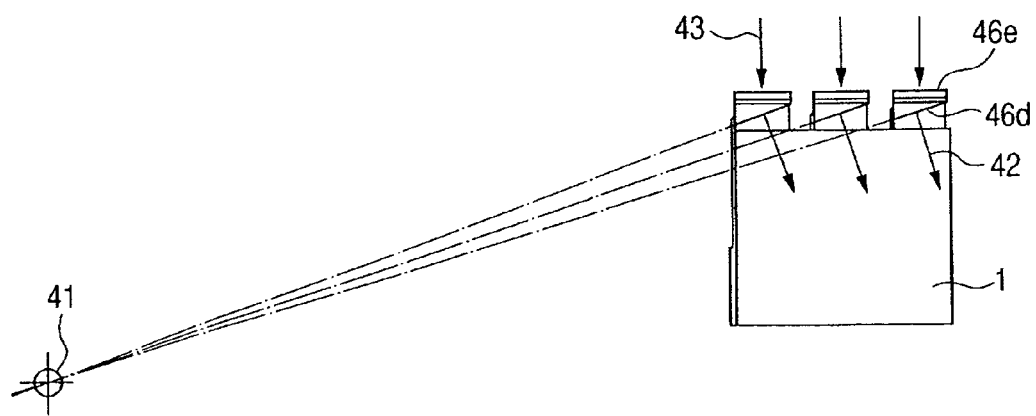
FIG. 12 shows the deformation direction of the connecting portion of the contact portion shown in FIG. 11.

FIG. 12 shows the deformation directions of the connecting portions 46b of the contact member 46.

In FIG. 12, the beam portion 46d of each connecting portion 46b, as described above, is formed into a state inclined toward the momentary rotation center of the vibration element and therefore, each connecting portion 46b is displaced in a direction orthogonal to the inclination direction, as indicated by arrow 42, against a pressure force 43 to the contact surface 46e. Therefore, the momentary rotation center 41 of the contact surface 46e of each connecting portion 46b is made substantially coincident with the momentary rotation center of the vibration element, and deformation free of the movement relative to the moving element 5 during the displacement of the contact surface 46e is made possible.

As described above, according to the present embodiment, in the contact member 46, the plurality of connecting portions 46b are disposed in a direction orthogonal to the movement direction of the moving element 5, and the beam portion 46d of each connecting portion 46b is inclined toward the momentary rotation center of the vibration element. Therefore, a remarkable increase in the contact pressure from the moving element 5 to the contact member 46 can be avoided. Further, it becomes possible to distribute the contact pressure averagely to the contact member 46.

Sixth Embodiment

A sixth embodiment of the present invention differs from the above-described first embodiment in that the vibration member is constituted by only a vibration member base, and the fixed portion of the contact member is given the function of a vibration expanding portion. The other elements (the piezoelectric element 3 and the moving element 5) in the present embodiment are the same as the corresponding ones in the above-described first embodiment and therefore need not be described.

Figure 13:
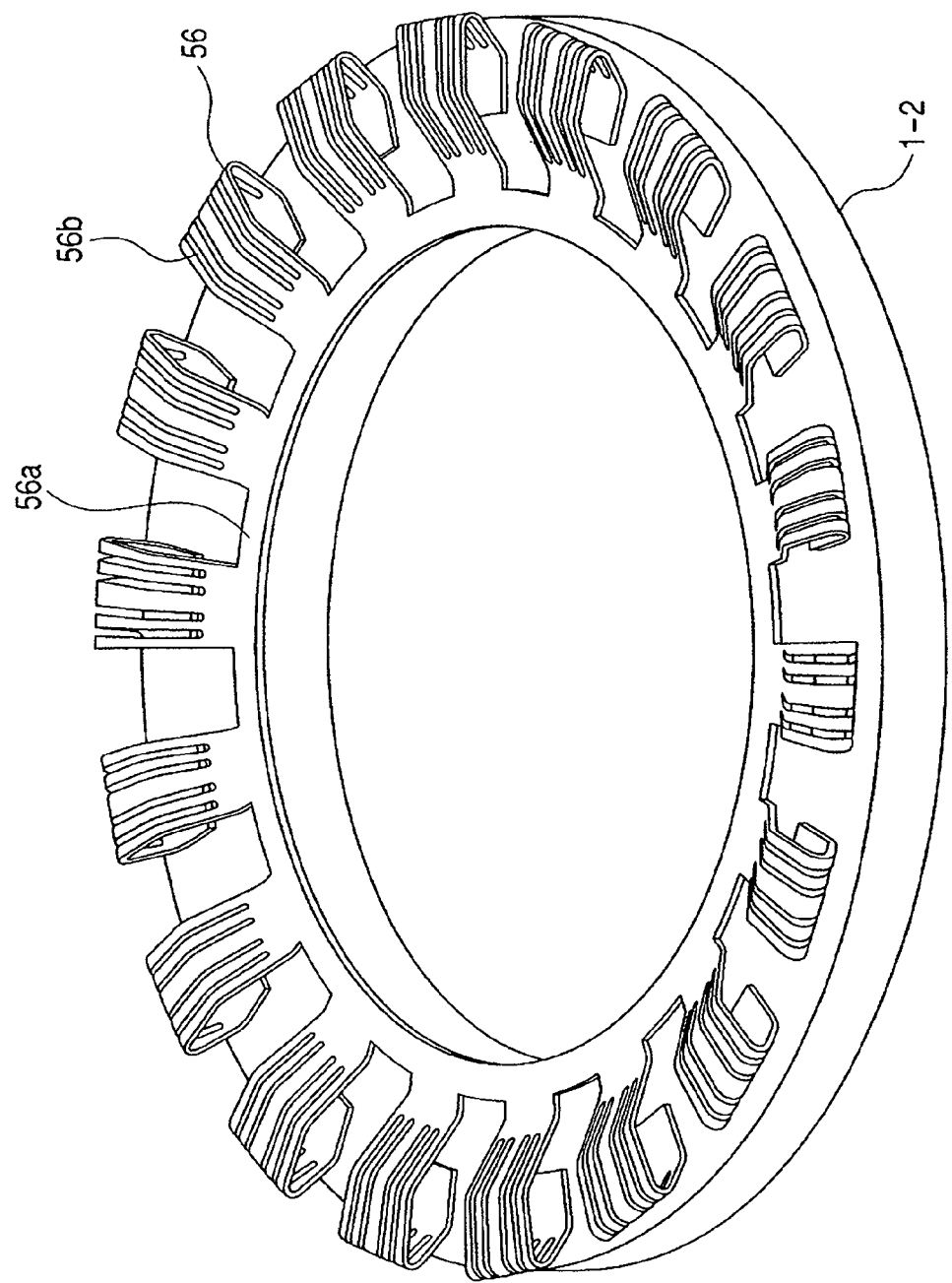
FIG. 13 is a pictorial perspective view of the vibration member and contact portion of a vibration wave motor according to a sixth embodiment of the present invention.
Figure 14:
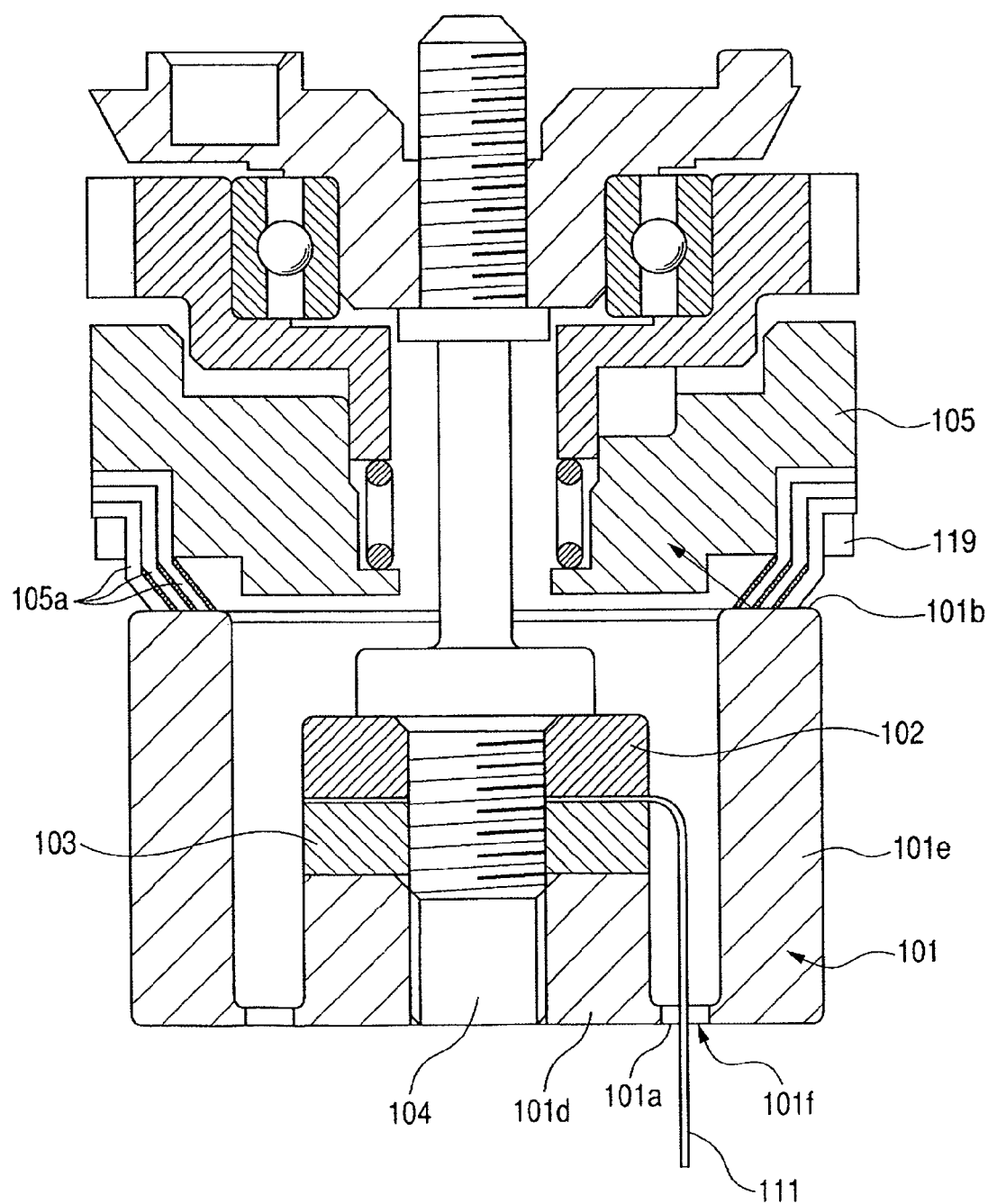
FIG. 14 is a cross-sectional view showing the construction of a vibration wave motor according to an example of the prior art.
Figure 15A:
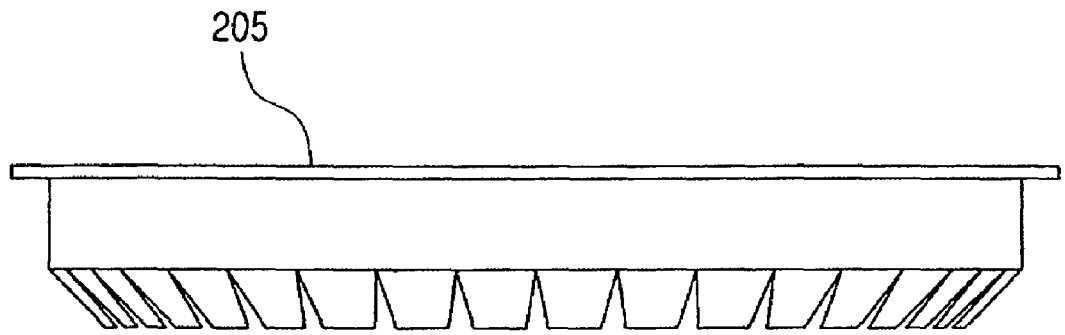
FIG. 15A shows the contact portion of a vibration wave motor according to another example of the prior art.
Figure 15B:
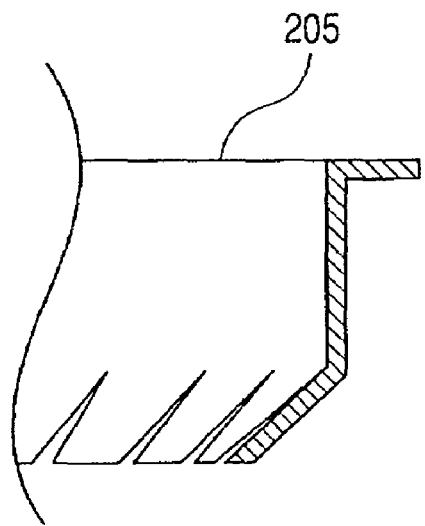
FIG. 15B is a partly enlarged view of the contact portion.
Figure 16A:
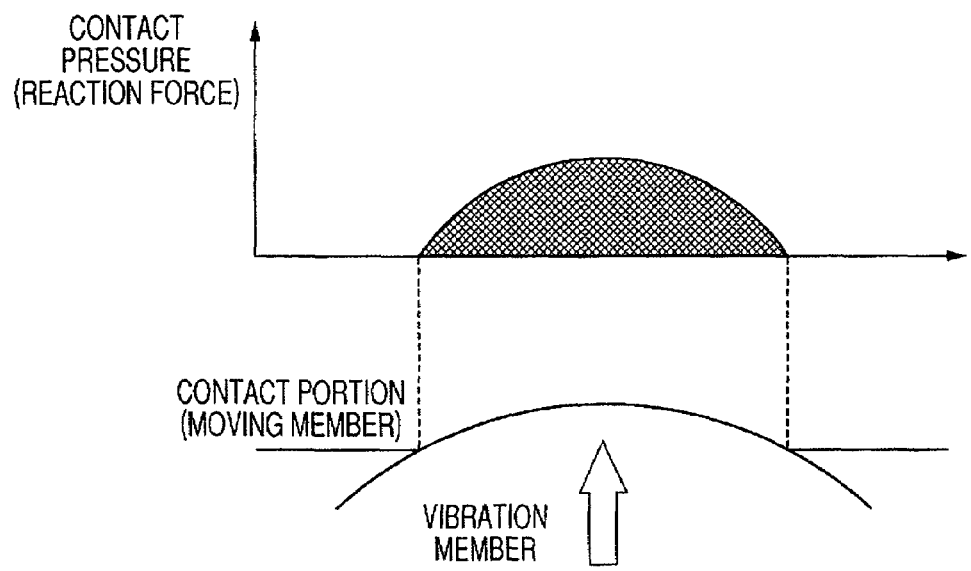
FIG. 16A shows a case where the vibration displacement of the vibration member of the vibration wave motor has a smooth distribution in the circumferential direction thereof.
Figure 16B:
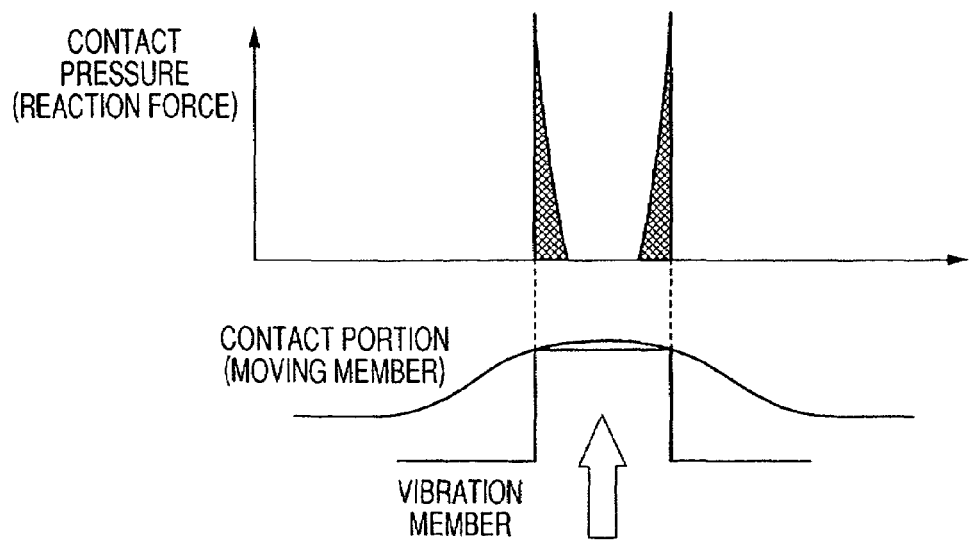
FIG. 16B shows a case where the vibration displacement of the vibration member of the vibration wave motor is forced displacement concentrating in a portion.
Figure 17:
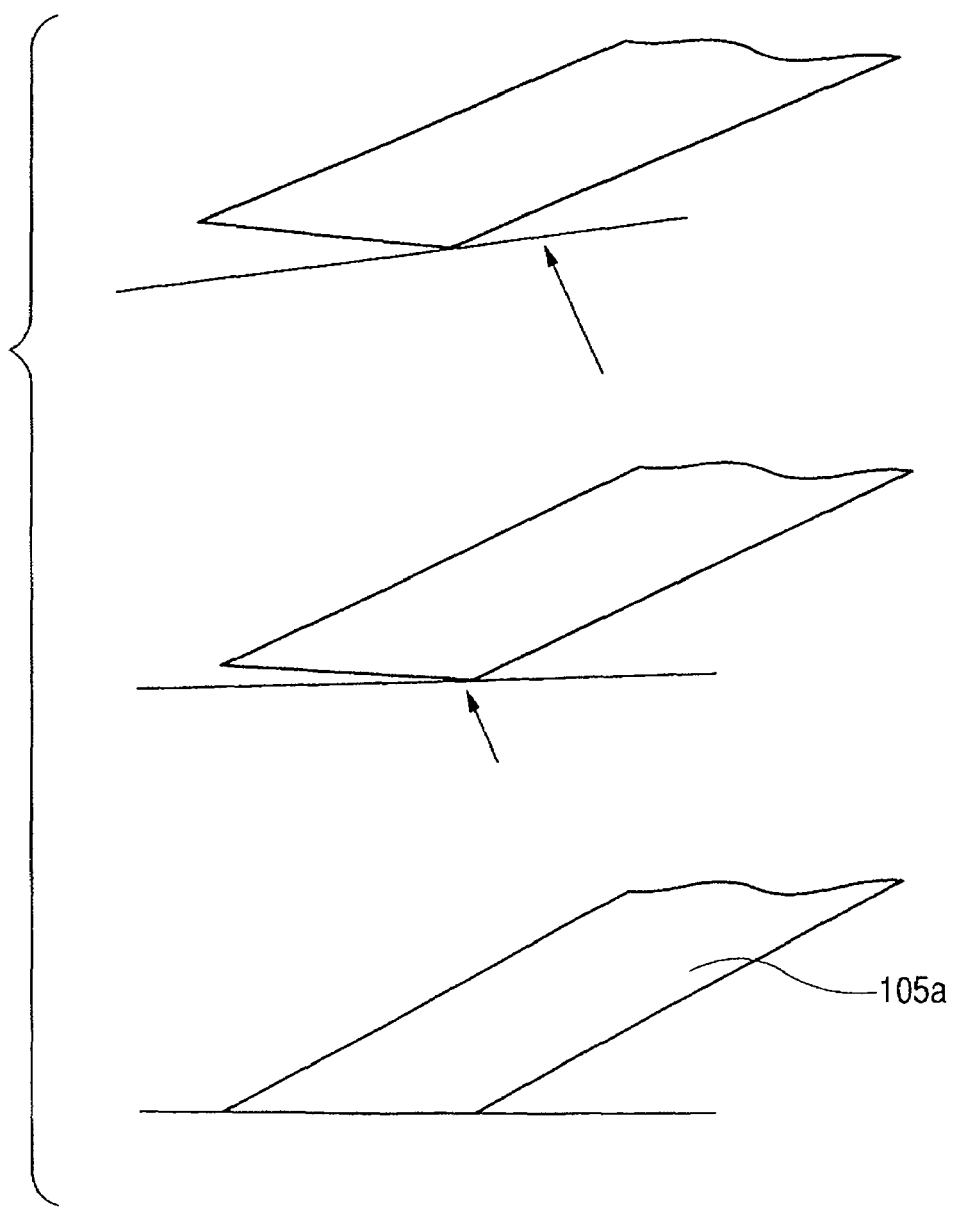
FIG. 17 shows the contact between the vibration member and moving member of the vibration wave motor.

FIG. 13 is a pictorial perspective view of the vibration member and contact portion of a vibration wave motor according to the present embodiment.

In FIG. 13, the vibration member 1 is provided with a vibration member base 1-2. A plurality of contact members 56 are disposed on the upper surface of the vibration member base 1-2 along the circumferential direction thereof, and each contact member 56 is provided with a connecting portion 56b having opposite-ends fixed beam structure divided into a plurality, and a fixed portion 56a integrally connected to the lower end of the connecting portion 56b and disposed along the circumferential direction of the vibration member base 1-2. The connecting portion 56b has a shape similar to the shape shown in FIG. 9.

In the above-described first to fifth embodiments, there is adopted a construction in which the vibration member 1 is comprised of a vibration expanding portion 1-1 and a vibration member base 1-2, and contact members 6 are disposed on the upper surface of the vibration expanding portion 1-1. In contrast, in the present embodiment, the fixed portions 56a of respective contact portions are made integral with one another by being formed into a circular ring-shaped plate shape along the circumferential direction of the vibration member base 1-2, and a plurality of contact portions are formed by a single contact member 56. Further, the fixed portions 56a are given the function of the vibration expanding portion 1-1, whereby the vibration member 1 is constituted by only the vibration member base 1-2.

The vibration expanding portion 1-1 constituting the vibration member 1 in the first to fifth embodiments is for expanding the vibration displacement in the movement direction (feeding direction) of the moving element 5 among the vibrations of the vibration element. In a case where as in the present embodiment, the fixed portion 56a of the contact member 56 is of a plate shape press-worked so as to be parallel to the underside (a plane containing the movement direction) of the moving element 5, the fixed portion exhibits high rigidity against the shearing deformation in the movement direction of the moving element 5. Therefore, it is possible to efficiently expand the vibration of the vibration member base 1-2 in the movement direction of the moving element 5.

As described above, according to the present embodiment, the vibration member 1 is constituted by only the vibration member base 1-2, and the fixed portion 56a of the contact member 56 is given the function of a vibration expanding portion and therefore, the contact pressure from the moving element 5 on the contact surface of the contact member 56 can be uniformized. Further, the shape of the vibration member 1 can be simplified, and this leads to the advantage that the inexpensive manufacture of the vibration wave motor is possible.

Other Embodiments

While in the above-described first to sixth embodiments, a construction in which the contact member is fixed to the vibration member constituting the vibration element has been mentioned as an example, the present invention is not restricted thereto, but there may be adopted a construction in which the contact member is fixed to the moving element.

While in the above-described first to sixth embodiments, a case where the vibration element is constructed by the joining of the piezoelectric element and the vibration member has been mentioned as an example, the present invention is not restricted thereto, but the vibration element itself may be constituted by the piezoelectric element.

As many apparently widely different embodiments of the present invention can be made without departing from the sprit and scope thereof, it is to be understood that the invention is not limited to the specific embodiment thereof except as defined in the appended claims.

This application claims priority from Japanese Patent Application Nos. 2005-103823 filed Mar. 31, 2005 and 2006-045504 filed Feb. 22, 2006, which is hereby incorporated by reference herein.

What is claimed is:

1. A vibration wave driving apparatus having:
   a vibration element provided with an electro-mechanical energy converting element;
   a moving element driven by vibration generated by said vibration element; and
   a plurality of contact members interposed between said vibration element and said moving element;
   wherein each of the contact members is provided with:
   a plurality of fixed portions fixed to one of said vibration element and said moving element;
   a plurality of connecting portions connected among said plurality of fixed portions, individually elastically deformable in a state separate from one of said vibration element and said moving element to which said fixed portions are fixed, and disposed at intervals narrower than the interval between adjacent ones of said contact members; and
   a contact surface constituting a portion of each of said connecting portions, and contacting with said moving element or said vibration element opposed to said contact members.

2. A vibration wave driving apparatus according to claim 1, wherein said plurality of connecting portions in each of the contact members is disposed in the propagation direction of a vibration wave generated by said vibration element.

3. A vibration wave driving apparatus according to claim 1, wherein said plurality of connecting portions in each of the contact members are disposed in a direction crossing the propagation direction of a vibration wave generated by said vibration element.

4. A vibration wave driving apparatus according to claim 1, wherein said plurality of connecting portions in each of the contact members are integrally formed through said fixed portions.

5. A vibration wave driving apparatus according to claim 1, wherein of said plurality of connecting portions in each of the contact members, the length of the beam of at least one connecting portion and the length of the beam of other connecting portion differ from each other.

6. A vibration wave driving apparatus according to claim 1, wherein said plurality of connecting portions in each of the contact members are provided with leg portions extending out from said fixed portions in a direction perpendicular to said contact surface.

7. A vibration wave driving apparatus according to claim 1, wherein said plurality of connecting portions in each of the contact members are provided with leg portions extending out from said fixed portions at an angle of 90° or less with respect to a normal to said contact surface.

8. A vibration wave driving apparatus according to claim 1, wherein said plurality of connecting portions in each of the contact members are said fixed portions and said contact surfaces connected together by a curved surface.

9. A vibration wave driving apparatus according to claim 1, wherein of said plurality of connecting portions in each of the contact members, the connecting portions disposed in a portion great in vibration amplitude are made longer.

10. A vibration wave driving apparatus according to claim 5, wherein of said plurality of connecting portions in each of the contact members, the length of the connecting portion located in a direction great in the vibration amplitude in the area of said contact surface is greater than the lengths of the other connecting portions.

11. A vibration wave driving apparatus according to claim 1, wherein said plurality of connecting portions in each of the contact members are displaced against a pressure force to said contact surface in a direction orthogonal to a direction linking the momentary rotation center of said vibration element and said connecting portions together.

12. A vibration wave driving apparatus according to claim 11, wherein said plurality of connecting portions in each of the contact members are provided with thin plate-shaped beam portions, and the thickness direction thereof is a direction substantially orthogonal to a direction linking the momentary rotation center of said vibration element and said connecting portions together.

13. A vibration wave driving apparatus according to claim 1, wherein said plurality of connecting portions in each of the contact members are provided with thin plate-shaped beam portions, and the thickness direction thereof is coincident with the vibration direction of said vibration element in said contact members.

14. A vibration wave driving apparatus according to claim 1, wherein of said plurality of connecting portions in each of the contact members, the connecting portions disposed in a portion great in vibration amplitude are made narrower in width.

15. A vibration wave driving apparatus according to claim 1, wherein said plurality of electro-mechanical energy converting elements in each of the contact members include a piezoelectric element.

* * * * *